(12) United States Patent
Meyer

(10) Patent No.: US 10,844,905 B2
(45) Date of Patent: Nov. 24, 2020

(54) PLANETARY TRANSMISSION

(71) Applicant: FLENDER GmbH, Bocholt (DE)

(72) Inventor: Thomas Meyer, Stolberg (DE)

(73) Assignee: FLENDER GMBH, Bocholt (DE)

( * ) Notice: Subject to any disclaimer, the term of this patent is extended or adjusted under 35 U.S.C. 154(b) by 0 days.

(21) Appl. No.: 16/330,248

(22) PCT Filed: Aug. 22, 2017

(86) PCT No.: PCT/EP2017/071140
§ 371 (c)(1),
(2) Date: Mar. 4, 2019

(87) PCT Pub. No.: WO2018/041671
PCT Pub. Date: Mar. 8, 2018

(65) Prior Publication Data
US 2019/0203768 A1 Jul. 4, 2019

(30) Foreign Application Priority Data

Sep. 2, 2016 (EP) .................................... 16187064

(51) Int. Cl.
F16H 57/08 (2006.01)
F16C 33/10 (2006.01)
(Continued)

(52) U.S. Cl.
CPC .......... F16C 33/1055 (2013.01); F03D 15/00 (2016.05); F03D 80/70 (2016.05);
(Continued)

(58) Field of Classification Search
CPC ...... F16C 33/1055; F16C 17/10; F16C 25/02; F16C 2360/31; F16H 57/0486;
(Continued)

(56) References Cited

U.S. PATENT DOCUMENTS 7,662,059 B2  2/2010 McCune
8,246,503 B2  8/2012 Sheridan et al.
(Continued)

FOREIGN PATENT DOCUMENTS

DE 102014205980 10/2015
DE 102014214331 1/2016
(Continued)

OTHER PUBLICATIONS

PCT International Search Report and Written Opinion of International Searching Authority dated Dec. 15, 2017 corresponding to PCT International Application No. PCT/EP2017/071140 filed Aug. 22, 2017.
(Continued)

Primary Examiner — David J Hlavka
(74) Attorney, Agent, or Firm — Cozen O'Connor

(57) ABSTRACT

A planetary transmission for a wind turbine includes a transmission housing, a central sun gear which has an outer toothing, a ring gear which has an inner toothing, a one-sided planetary carrier, and multiple planetary gears mounted on the planet carrier via a planetary gear bearing configured as a sliding bearing such that they can rotate about planetary gear rotational axes and that have outer toothings that engage with the inner toothing of the ring gear and the outer toothing of the sun gear, where every planetary gear bearing has two annular bearing bodies penetrated by a planetary gear shaft and rotationally fixed thereon and have conical sliding surfaces on the outer circumferential surfaces thereof such that tapered ends of the bearing bodies point towards one another, and where surfaces corresponding to the sliding surfaces of the planetary gear bearing are formed on inner circumferential surfaces of the planetary gear.

29 Claims, 8 Drawing Sheets

(51) Int. Cl.
  *F16C 25/02* (2006.01)
  *F03D 15/00* (2016.01)
  *F16C 17/10* (2006.01)
  *F03D 80/70* (2016.01)
  *F16H 1/28* (2006.01)
  *F16H 57/04* (2010.01)

(52) U.S. Cl.
  CPC .............. *F16C 17/10* (2013.01); *F16C 25/02* (2013.01); *F16H 1/28* (2013.01); *F16H 57/043* (2013.01); *F16H 57/0479* (2013.01); *F16H 57/0486* (2013.01); *F16H 57/082* (2013.01); *F05D 2260/40311* (2013.01); *F05D 2260/98* (2013.01); *F16C 2360/31* (2013.01); *F16H 2057/085* (2013.01); *Y02E 10/722* (2013.01)

(58) Field of Classification Search
  CPC ...... F16H 57/0479; F16H 57/043; F16H 1/28; F16H 57/082; F16H 2057/085; F03D 80/70; F03D 15/00; Y02E 10/722; F05D 2260/98; F05D 2260/40311
  See application file for complete search history.

(56) References Cited

U.S. PATENT DOCUMENTS

| | | | |
|---|---|---|---|
| 8,636,615 | B2 | 1/2014 | Suzuki et al. |
| 2002/0114549 | A1* | 8/2002 | Hokkirigawa .......... F16C 17/10 384/297 |
| 2008/0315697 | A1* | 12/2008 | Bonnet ................... F03D 15/00 310/83 |
| 2012/0108380 | A1* | 5/2012 | Dinter .................... F03D 80/70 475/159 |
| 2015/0125104 | A1* | 5/2015 | Kullin ................... F16C 19/545 384/558 |
| 2016/0327148 | A1* | 11/2016 | Dinter .................... F16H 57/08 |
| 2018/0347623 | A1* | 12/2018 | Hori ......................... C21D 9/40 |

FOREIGN PATENT DOCUMENTS

| | | |
|---|---|---|
| EP | 2383480 | 11/2011 |
| EP | 3091255 | 11/2016 |

OTHER PUBLICATIONS

Office Action dated Jul. 17, 2020 issued in India Patent Application No. 201937007560.

* cited by examiner

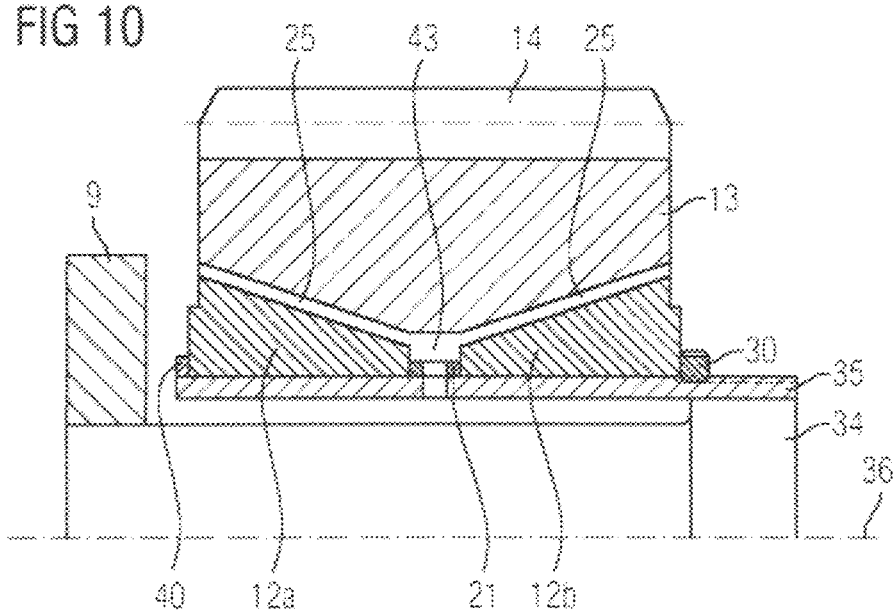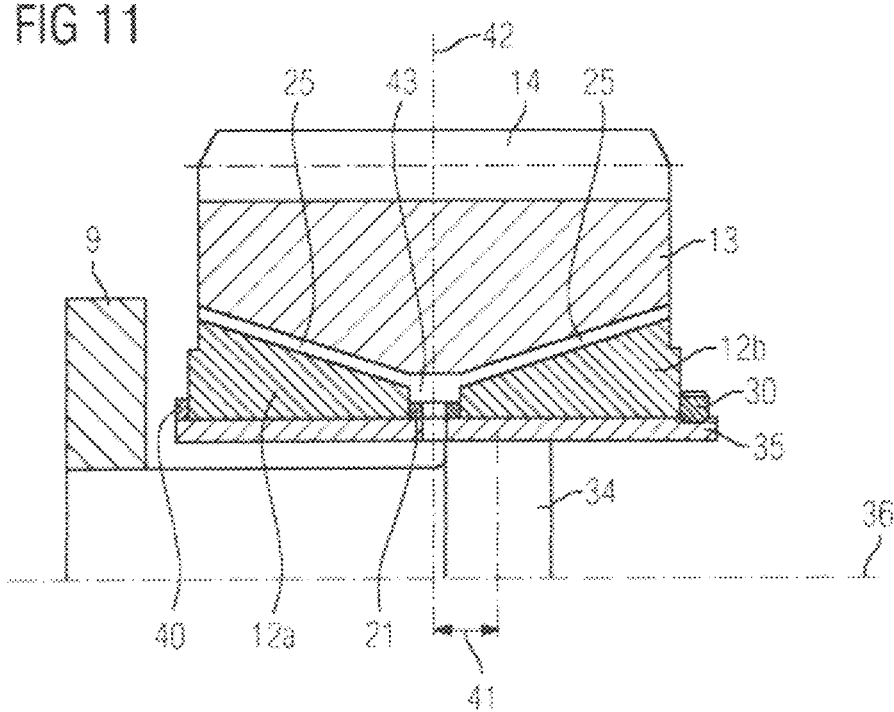

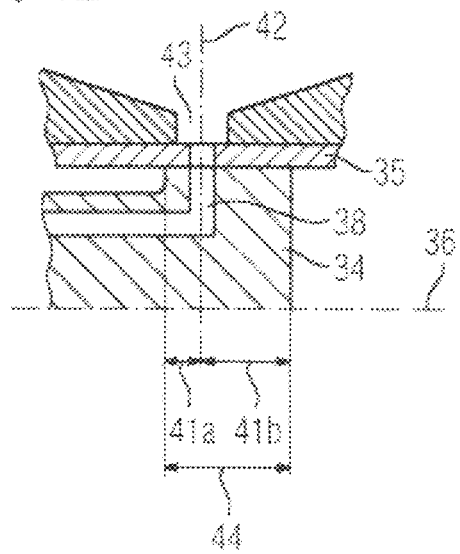
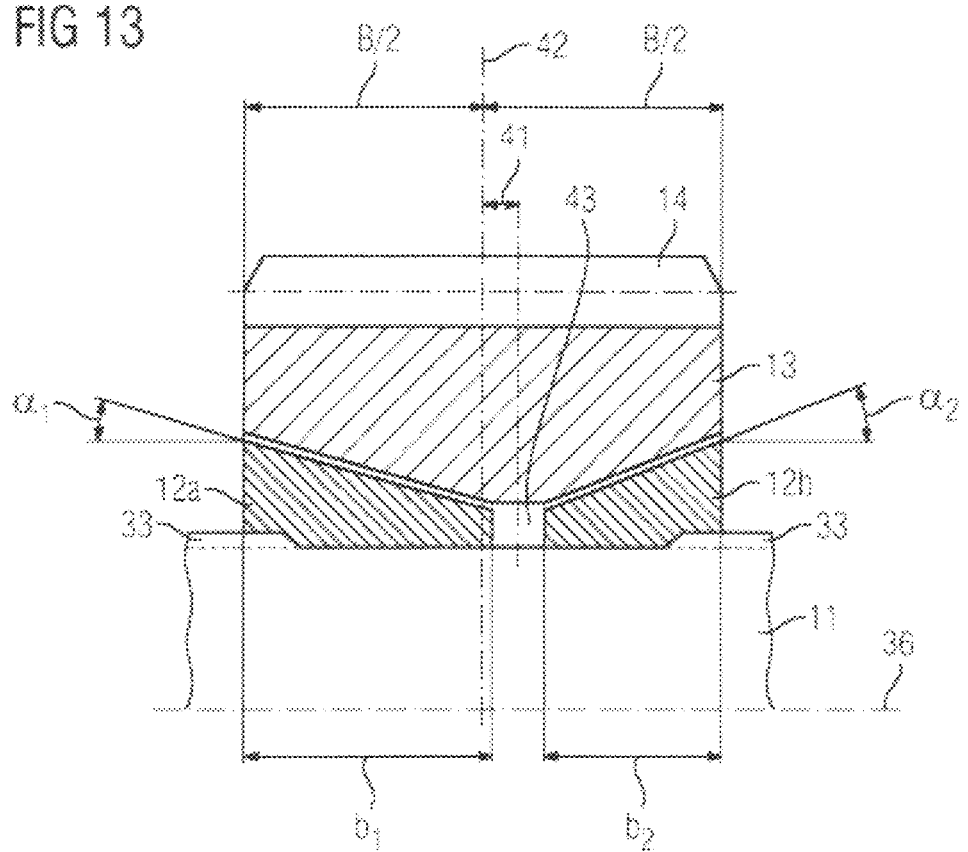

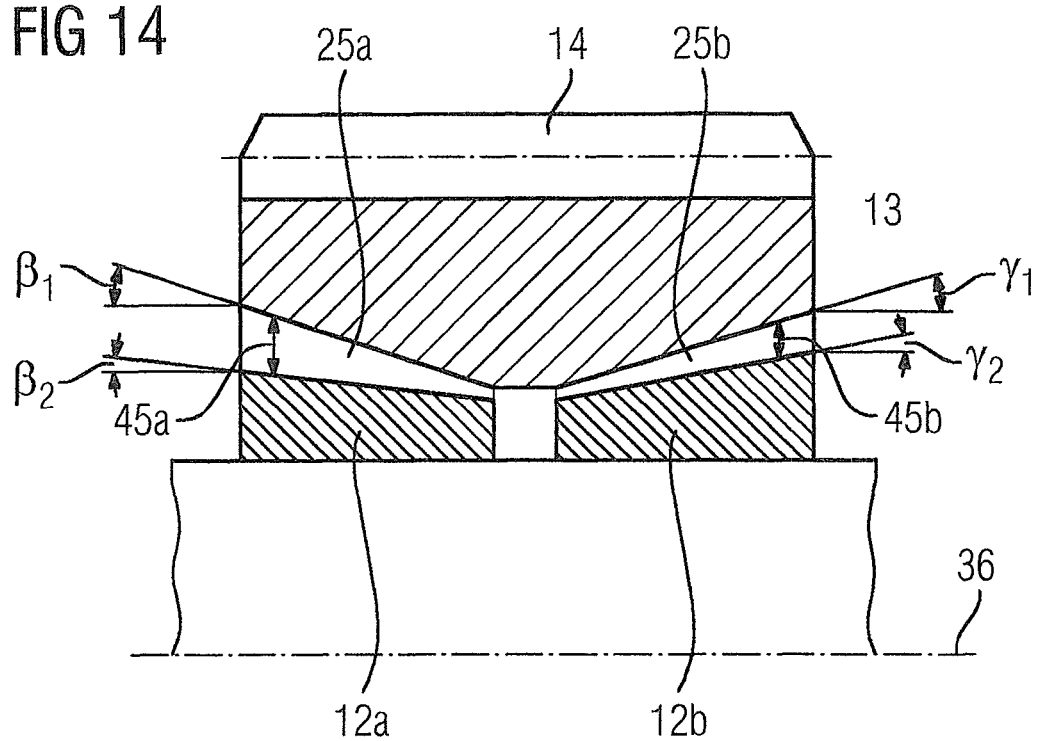

PLANETARY TRANSMISSION

CROSS-REFERENCE TO RELATED APPLICATIONS

This is a U.S. national stage of application No. PCT/EP2017/071140 filed Aug. 22, 2017. Priority is claimed on EP Application No. 16187064 filed Sep. 2, 2016, the content of which is incorporated herein by reference in its entirety.

BACKGROUND OF THE INVENTION

1. Field of the Invention

The present invention relates planetary transmissions and, more particularly, to a planetary transmission for a wind turbine, comprising a transmission housing, a central sun gear that is retained in the transmission housing such that it can rotate about a central transmission rotational axis and that has an outer toothing, a ring gear that is arranged concentrically in relation to the central transmission rotational axis in the transmission housing and which has an inner toothing, a planetary carrier that is mounted in the transmission housing such that it can rotate about a central transmission rotational axis and multiple planetary gears that are mounted on the planetary carrier via a planetary gear housing configured as a sliding bearing such that they can rotate about planetary gear rotational axes and that have outer toothings that engage with the inner toothing of the ring gear and the outer toothing of the sun gear.

2. Description of the Related Art

Planetary transmissions serve, for example, as transmissions for converting a low rotational speed of a drive shaft of the planetary transmission into a much higher speed of a take-off shaft of the planetary transmission. Accordingly, planetary transmissions are frequently built into wind turbines, where a low speed of the rotor shaft is converted into a far higher speed of the generator shaft. When used in wind turbines, because of the variable wind conditions, planetary transmissions are operated under widely changing operating conditions. As a result of occasionally extremely low rotational speeds of the drive shaft and at the same time extremely high forces acting on the bearings, roller bearings for bearing support of the planetary gears can be built into planetary transmissions for wind turbines.

However, as an alternative, planetary gear bearings for wind turbines can also be embodied as sliding bearings. Such a planetary transmission for a wind turbine is described in EP 2 383 480 A1, for example, and has a transmission housing in which a central sun gear with outer toothing is retained so that it can rotate about a central transmission axis. Furthermore, a ring gear with inner toothing is provided in the transmission housing concentric to the central rotational axis of the transmission. A planetary carrier is likewise supported in a transmission housing to allow its rotation about the central rotational axis of the transmission. Retained on the planetary carrier are a number of planetary gears. The planetary gears have outer toothing that engages with the inner toothing of the ring gear and the outer toothing of the sun gear.

The planetary gears are rotatably supported on the planetary gear bearings formed as radial sliding bearings. For reliable operation of the radial sliding bearing, its bearing play must also take into consideration that temperature-dependent and/or load-dependent expansions and/or deformations can occur during the operation of the radial sliding bearing. Therefore, the components of the radial sliding bearing and/or the running surfaces of the supported planetary gears must be manufactured with high precision, i.e., with low production tolerances and/or must be reworked during installation, which is associated with high costs.

During the operation of the radial sliding bearing, the bearing play gradually changes as a result of wear, which can lead to a malfunction or to a failure of the radial sliding bearing. Therefore, regular maintenance and, where necessary, replacement of the radial sliding bearing is necessary, if the bearing play of the radial sliding bearing threatens to exceed a permissible range. This is associated with corresponding downtimes, especially when the bearings are used in wind turbines.

Radial sliding bearings can exclusively dissipate radial forces. In order to also guide the planetary gears axially and to prevent axial movements of the planetary gears, supplementary axial sliding bearings, which dissipate axial forces acting on the planetary gears, are necessary. Such axial sliding bearings can be formed in the contact area between flanges of the planetary carrier and end face sides of the planetary gears, for example, and likewise increase the costs of such planetary gear bearings.

Strains can also result during the operation of the planetary transmission if play in the bearings changes. This can then in its turn lead to higher wear and to a greater play in the bearings.

SUMMARY OF THE INVENTION

It is an object of the present invention is to provide a planetary transmission, which corresponds in particular to that stated at the outset, which makes a simple structure possible, exhibits little wear and/or is easy to handle, where the bearing play of sliding bearings particularly employed is easy to set.

These and other objects and advantages are achieved in accordance with the invention by a planetary transmission, particularly for a wind turbine, with a transmission housing that comprises a central sun gear that is retained in the transmission housing such that it can rotate about a central transmission rotational axis in the transmission housing and bears outer toothing, and a ring gear that is arranged concentrically to the central transmission rotational axis and has inner toothing. The planetary transmission particularly has a one-sided planetary carrier, which is mounted in the transmission housing such that it can rotate about the central transmission rotational axis, and multiple planetary gears that are mounted on the planet carrier via a planetary gear housing configured as a sliding bearing such that they can rotate about planetary gear rotational axes and that have outer toothings that engage with the inner toothing of the ring gear and the outer toothing of the sun gear. The one-sided planetary carrier has only one flange compared to the two-sided planetary carrier. The two-sided planetary carrier has flanges on both sides of the planetary gears arranged in one plane, which carry or guide the planetary gears.

In the one-sided planetary carrier, the planetary gear shaft is only carried via precisely one carrier on precisely one end face side of the planetary gear. This applies especially to all planetary gears of the planetary transmission.

In the one-sided planetary carrier, the planetary gear is only retained via this one planetary carrier.

In the one-sided planetary carrier, the planetary gear is only supported on one shaft, in particular the drive shaft or the take-off shaft of the transmission.

In the one-sided planetary carrier, the planetary gears are only retained by one carrier on only one end face side of the planetary gears.

In a transmission with a one-sided planetary carrier, there is a carrier on one end face side of the planetary gears and no carrier on the other end face side of the planetary gears, so that there is only the one-sided planetary gear carrier as a carrier.

Each planetary gear bearing has two annular bearing bodies, where at least one of the annular bearing bodies is penetrated by a planetary gear shaft and is rotationally fixed on same, where conical sliding surfaces are formed on the outer circumferential surfaces of the bearing bodies such that the tapered ends of the bearing bodies point towards one another, and where running surfaces corresponding to the sliding surfaces of the planetary gear bearing are formed on the inner circumferential surfaces of the planetary gear.

A conical planetary sliding bearing can be realized in one-sided and also in two-sided planetary carriers. In a two-sided planetary carrier, this can result in a stress. Thus, it can be that the planetary gear shaft flexes between its clamping points in the flanges.

This deformation is to be compensated for or prevented by reinforcements, and also by a torsion of the two-sided planetary carrier being skewed in relation to the two central toothed wheels ring gear and sun gear. This can lead within the tooth engagements to an uneven width load distribution.

With the use of a one-sided planetary carrier, problems that can occur in a two-sided planetary carrier can be avoided and/or prevented. With a one-sided planetary carrier, the planetary gear shaft is only connected on one side to the planetary gear carrier. A free end of the shaft is produced in relation to clamping. The entire module can be mounted via an axial slip-in assembly. Thus, the form fit of the sliding cone bearing no longer needs to represent a problem.

In one embodiment of the planetary transmission, the transmission has a first end face side and a second end face side, where the one-sided planetary carrier is in the area of only one end face side, in particular the first end face side, and where the at least one annular bearing body, which is penetrated by the planetary gear shaft and is fixed rotationally on said shaft, is decoupled on the second end face side from a further planetary gear. The decoupling is particularly produced by it not having a second flange, which serves as a mirror-image flange for carrying a plurality of planetary gears.

This produces a combination of sliding cone bearings in conjunction with a one-sided planetary gear carrier for, e.g., planetary transmission stages, industrial and/or wind turbine transmissions. This gives the option of slide-in assembly of modules of the planetary transmission. A robust torsion proofing of components on the shaft is also possible. Furthermore, this results in at least reduced restrictions on a maximum diameter of the shaft. Furthermore this can result in the following: No restriction on the carrier support on the shaft seat in the carrier and/or an improved accessibility for setting the play in the bearing.

If each planetary gear carrier in the planetary transmission has two annular bearing bodies, which are penetrated by a planetary gear shaft and fixed rotationally on the shaft and on the outer circumferential surfaces of which conical sliding surfaces are embodied, then these can be formed so that it is possible to easily set the bearing play of the sliding bearing used and to achieve a simple structure. This is based on the consideration of using axially divided double sliding cone bearings, which are capable of dissipating both axial and also radial forces. The opposing arrangement of the two conical sliding surfaces means that a planetary gear can be defined both in the axial direction and also in the radial direction. Here, by axial adjustment of the conical bearing bodies relative to the planetary gear, which possesses corresponding conical running surfaces, the radial bearing play can be set in a simple manner. The torsion proofing of the bearing bodies can be brought about, for example, by bearing bodies produced with excess dimension being shrunk onto the planetary gear shaft after they have been positioned.

In one embodiment of the planetary transmission, a latching of at least one bearing body on the planetary gear shaft occurs, in order to latch the at least one bearing body. The at least one bearing body is fixed axially on the planetary gear shaft by the latching.

In another embodiment of the planetary transmission, the planetary gear shaft is a flex pin with a hollow cylinder. The hollow cylinder carries at least one of the bearing bodies.

In a further embodiment of the planetary transmission, the flex pin has a lubricant line. The lubricant line is also routed in particular through the hollow cylinder, so that lubricant can enter the sliding bearing and get between the sliding/running surfaces.

In another embodiment of the planetary transmission, a lubrication gap is provided between the sliding surfaces of the planetary gear carrier and the corresponding running surfaces of the supported planetary gear, where a first of these lubrication gaps is different from the second of these lubrication gaps.

In a further embodiment of the planetary transmission, a first lubrication gap and a second lubrication gap have a different axial length. Influence can be exerted on the load distribution in this way, for example.

In yet another embodiment of the planetary transmission, at least one of the lubrication gaps has axially different heights. The transport of the lubricant can be influenced in this way, for example.

In another embodiment of the planetary transmission, the first lubrication gap is at a different angle to the rotational axis of the planetary gear than the second lubrication gap. The distribution of forces in the bearing can be influenced in this way.

In a further embodiment, at least one bearing body is adjustable in the axial direction, in order to set a lubrication gap of defined height between the sliding surfaces of the supported planetary gear carrier and the corresponding running surfaces. An optimum height of the lubrication gap between the sliding surfaces of the supported planetary gear carrier and the corresponding running surfaces is an important precondition for reliable operation of the planetary transmission.

In another embodiment, one bearing body is adjustable, while the other bearing body has an axially fixed position. The bearing body with the axially fixed position can serve as a reference for adjusting the adjustable bearing body, which is compatible with a simple and precise setting of the optimum height of the lubrication gap of the planetary gear carrier. In a further embodiment of the planetary transmission, the axial position of the axially fixed bearing body can be defined by an axial stop. A flange of the planetary gear carrier or a radial annular shoulder formed on the planetary gear axis can serve in particular as an axial stop.

In an embodiment, an adjuster for axial adjustment is assigned to the adjustable bearing body. Such an adjuster simplifies the setting and in particular also the convenient subsequent adjustment of the inventive planetary transmission as part of maintenance, if the height of the lubrication gap of the sliding body has changed through wear.

In one embodiment of the planetary transmission, distance elements are provided as the adjuster, which are arranged between a bearing body and the neighboring flange of the planetary carrier and/or between the bearing bodies. The choice of a suitable number of distance elements and their arrangement at the specified axial positions within the sliding bearing enables a height of the lubrication gap of the sliding bearing to be set, where production inaccuracies of the bearing components can be compensated for.

In a further embodiment of the planetary transmission, the adjustable bearing body is screwed onto the planetary gear shaft. For this purpose, an inner thread is formed on the adjustable bearing body and a corresponding outer thread is embodied on the planetary gear shaft. With a screw connection of this type the axial position of the adjustable bearing body is able to be set steplessly by turning it about the planetary gear shaft.

As an alternative, the adjustable bearing body can be screwed into a neighboring flange of the planetary gear carrier. For this purpose, an outer thread is formed on the adjustable bearing body and a corresponding inner thread is formed in the neighboring flange of the planetary gear carrier. With a screw connection of this type, the axial position of the adjustable bearing body can be set steplessly by screwing it into a neighboring flange of a planetary gear carrier.

In such cases, torsion proofing can be provided, via which the bearing body screwed into the planetary gear carrier or the flange can be fixed. Torsion proofing also allows a secure fixing of the set axial position of the adjustable bearing body. Rings on the shaft of which the outer dimension is larger than the holes in the planetary gear carrier can be used with the bearings described, the shaft does not have to be designed with steps.

In a further embodiment of the planetary transmission, a combination of a number of different adjusters is also possible for setting the optimum height of the lubrication gap of the planetary gear bearing.

In an embodiment of the planetary transmission, the at least one lubrication pocket is formed in each sliding surface, into which a lubricant channel opens out, which penetrates the bearing body radially, where the lubricant channel is connected to an eccentric lubricant feed channel, which is formed in the planetary gear shaft and axially penetrates the shaft. During the normal operation of the planetary transmission, lubricant will be supplied to the sliding surfaces of the planetary gear bearing as part of a pressurized lubrication. The lubricant is introduced under pressure into the eccentric lubricant feed channel and flows from there through lubricant channels into the lubricant pockets, from where it is distributed onto the sliding surfaces.

In a further embodiment, a distance ring is formed between the bearing bodies, which surrounds the planetary gear shaft and defines a minimum axial distance between the bearing bodies. Such a distance ring can prevent the axial distance and thus the height of the lubrication gap being set too small, which is an obstacle to the planetary gear running with as little wear as possible.

In one embodiment of the planetary transmission, a lubricant collection groove can be formed on an inner circumferential surface of the distance ring. This lubricant collection groove can be used for distribution of lubricant between the bearing bodies.

In another embodiment of the planetary transmission a plurality of lubricant channels, which open out into the lubricant collection groove are formed in the distance ring. These lubricant channels enable lubricant to flow out of the lubricant collection groove in the direction of the lubrication gap.

In yet another embodiment of the planetary transmission, a lubricant feed channel, which opens out radially into the lubricant collection groove of the distance ring is formed in the planetary gear shaft. Such a lubricant feed channel allows lubricant to be supplied to the lubricant collection groove in the distance ring in the form of centrifugal lubrication. Centrifugal lubrication makes it possible to continue to operate the planetary transmission in an emergency mode if the pressure lubrication fails.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Further features and advantages of the present invention will become clear from examples based on the description given below of various exemplary embodiments of the inventive planetary transmission, which refer to the enclosed drawing, in which:

FIG. 10 shows a section of a cross-sectional view of a planetary gear carrier with a flex pin in accordance with the invention;

FIG. 11 shows a section of a cross-sectional view of a planetary gear carrier with a shortened flex pin in accordance with the invention;

FIG. 12 shows a flex pin with a lubricant line in accordance with the invention;

FIG. 13 shows a section of a cross-sectional view of a planetary gear carrier with asymmetrical bearing bodies in accordance with the invention; and FIG. 14 shows a section of a cross-sectional view of a planetary gear carrier with a lubrication gap of different height in accordance with the invention.

DETAILED DESCRIPTION OF THE EXEMPLARY EMBODIMENTS

Figure 1:
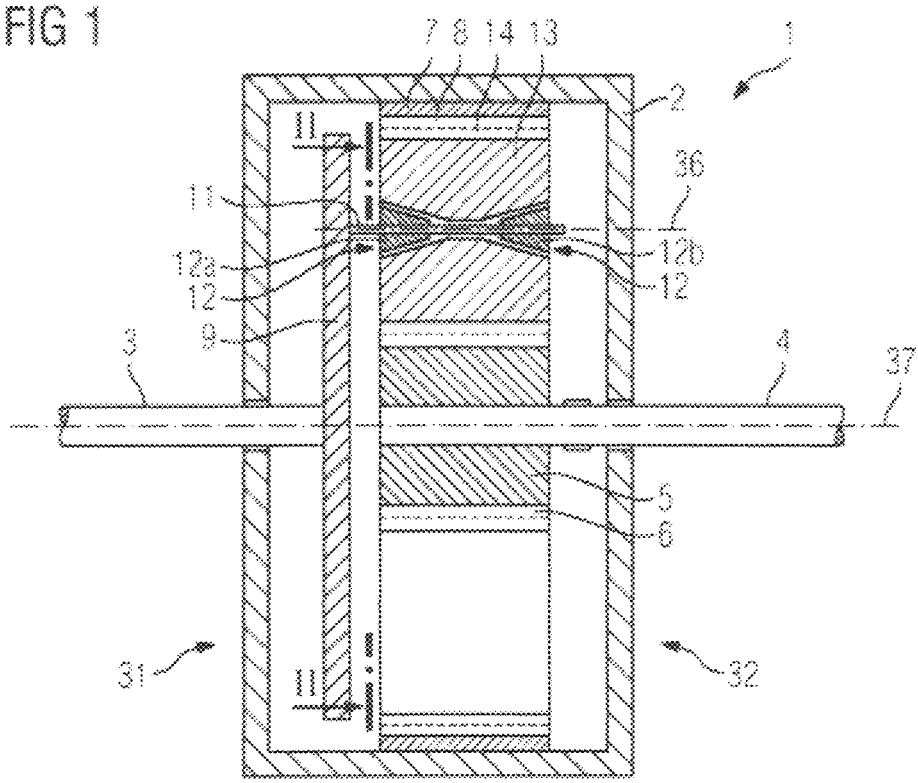
FIG. 1 shows a schematic axial cross-sectional view of a planetary transmission in accordance with a first embodiment.
Figure 2:
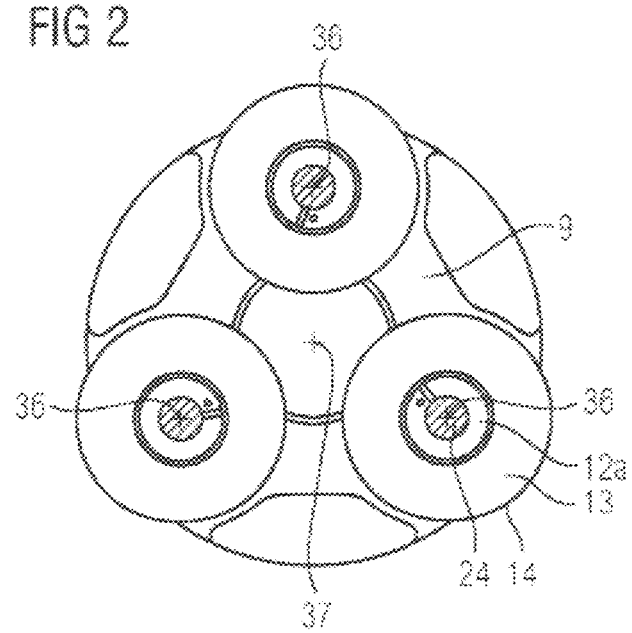
FIG. 2 shows an axial overhead view of a planetary carrier of the planetary transmission shown in FIG. 1, along the line II-II.
Figure 3:
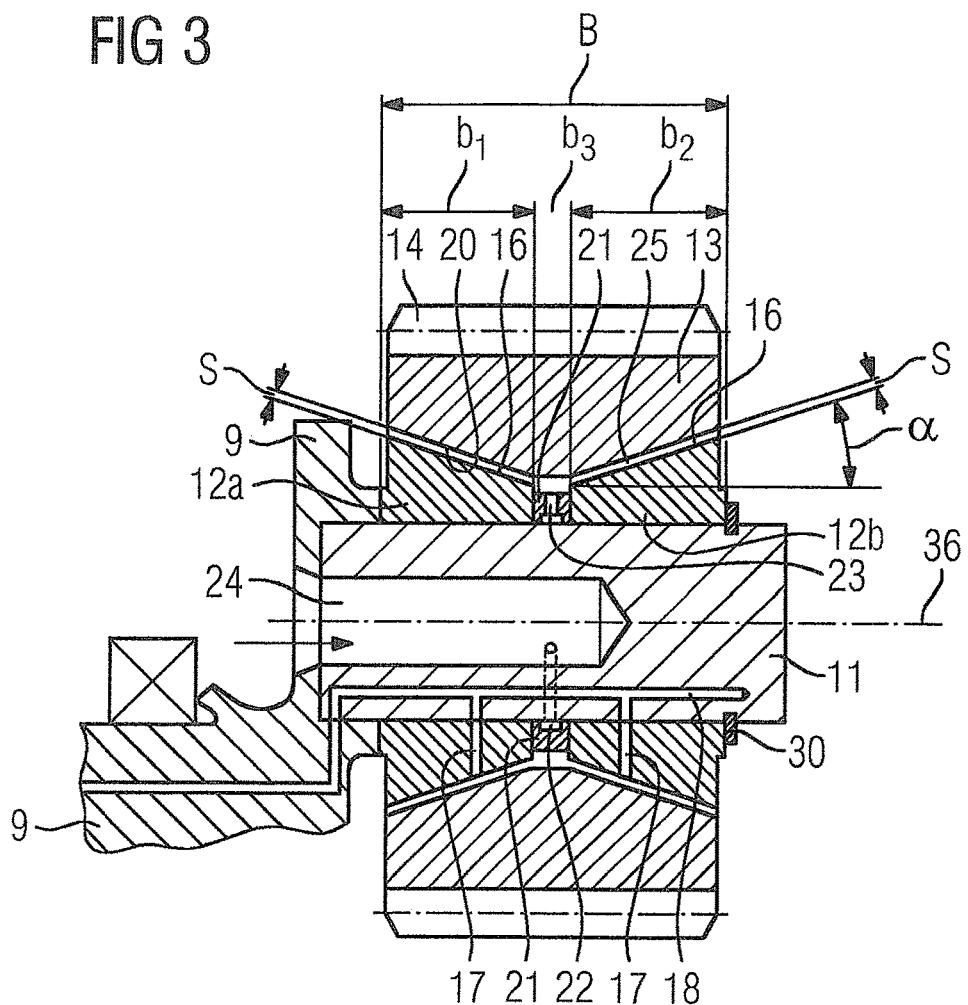
FIG. 3 shows an axial cross-sectional view of a planetary gear carrier of the planetary transmission shown in FIG. 1.
Figure 4:
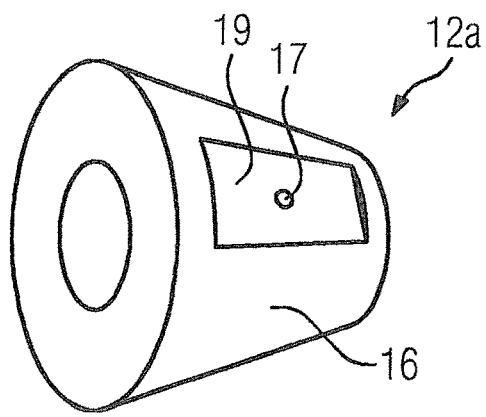
FIG. 4 shows a perspective side view of a bearing body of the planetary transmission shown in FIG. 1.

FIGS. 1 to 4 show a planetary transmission 1 in accordance with a first embodiment of the present invention. The planetary transmission 1 has a transmission housing 2, which is penetrated on opposing end face sides by a drive shaft 3 and a take-off shaft 4 respectively. In the transmission housing 2, a central sun gear 5 with an outer toothing 6 is retained rotatably on the take-off shaft 4 about the central transmission rotational axis 37. Arranged in the transmission housing 2 in an axial direction corresponding to the sun gear 5 is a ring gear 7 with an inner toothing 8 concentric to the central transmission rotational axis 37, which has a fixed connection to the transmission housing 2 and surrounds the sun gear 5. A planetary carrier 9 is retained rotatably about the central transmission rotational axis 37 in the transmission housing 2 on the drive shaft 3. The planetary carrier 9 has a flange 9 on a first end face side of the planetary transmission 1 or the planetary gears 13. There is no further flange located on the second end face side 32 of the planetary transmission 1 or the planetary gears 13. The flange 9 carries the planetary gears. The planetary carrier 9 is configured such that the carrier only has one flange 9 on the drive shaft 3 side. There are also planetary transmissions in which the planetary carrier has two flanges, where one flange is in the area of the first end face side and a second flange is in the area of the second end face side. The two flanges are then connected to one another via planetary gear shafts. The planetary gears are arranged between these two flanges of the planetary carrier. This is not shown in FIG. 1, however. The setting of the bearing play of the sliding cone bearings for the two-sided planetary carrier is complex, at the same time the components must be secured on the shaft to prevent them from turning. This is made difficult by the two-sided planetary carrier and the form fit of the sliding cone bearings, because the shaft is introduced axially as the last component into the subassembly of the carrier. Accordingly, no radial torsion proofing of the components on the shaft can be realized in this way. The planetary transmission 1 of FIG. 1 only has one flange.

For improved clarity only one planetary gear shaft 36 is shown in FIG. 1. The planetary carrier 9 can also carry a number of planetary gear shafts other than three. Provided on each planetary gear shaft 11 is a planetary gear bearing 12 formed as a sliding bearing, in which a planetary gear 13 is rotatably supported about a planetary gear rotational axis 36. The planetary gears 13 have external toothings 14, which engage with the inner toothing 8 of the ring gear 7 and the outer toothing 6 of the sun gear 5. The planetary gear bearing 12 has a first bearing body 12a and a second bearing body 12b.

In the one-sided planetary carrier 9, the planetary gear rotational axis 36 is only connected to the planetary carrier 9 on one side. Thus, a free end of the planetary gear rotational axis 36 is produced in relation to clamping. This subassembly can now be mounted via an axial slide-in assembly. In this way, even a form fit of the conical sliding bearing cannot present any problem. The bearing body 12a (this can also be referred to as a sliding bearing ring) can be secured radially on the shaft against rotation. The planetary gear is then mounted axially over the free end of the planetary gear rotational axis 36, before the further bearing body 12b is put on axially. On the free end of the planetary rotational axis 36 there is good access provided for an axial torsion proofing of the bearing body 12b, and also sufficient free space for measuring and setting the bearing play. This solution can also be achieved with a flex pin, where a flex pin is not shown in FIG. 1. A flex pin 34 is shown in FIGS. 10 to 12. A skewed setting of the planetary gear is also to be prevented in this way.

Each planetary gear carrier 12 has two annular bearing bodies 12a and 12b, which are penetrated by the planetary gear shaft 11 and are held on the shaft in a torsion-proof manner. Formed on the outer circumferential surfaces of the bearing bodies 12a, 12b are conical sliding surfaces 16, which each make an acute angle α with the central transmission rotational axis 37 that preferably amounts to 5° to 40°. Bevels or the like can be provided in axial edge areas of the sliding surfaces 16, in order to counteract edges being formed as a result of wear.

Each bearing body 12a, 12b is penetrated radially by a lubricant channel 17. The lubricant channel 17 is connected to an eccentric lubricant feed channel 18, which penetrates the planetary gear shaft 11 axially. The lubricant channel 17 opens out into a lubrication pocket 19, which is formed in an area of the sliding surface 16 of the bearing body 12a, 12b subject to little load as a flattening-off or a recess. Through the lubricant feed channel 18, the lubricant channel 17 and the lubrication pocket 19 the sliding surfaces 16 are supplied with lubricant in the form of a pressure lubrication during regular operation of the planetary gear bearing 12.

The tapered ends of the bearing bodies 12a, 12b point towards each other, where running surfaces 20 corresponding to the sliding surfaces 16 of the planetary gear bearing 12 are formed on the inner circumferential surfaces of the planetary gear 13.

Arranged between the bearing bodies 12a, 12b of the planetary gear bearing 12 is a distance ring 21, which surrounds the planetary gear shaft 11 and defines a minimum distance between the bearing bodies 12a, 12b. Formed on the inner circumferential surface of the distance ring 21 is an annular lubricant collection groove 22, into which a plurality of lubricant channels 23 penetrating the distance ring open out. Corresponding to the lubricant collection groove 22 of the distance ring 21, a central lubricant feed channel 24, which opens out into the lubricant collection groove 22 of the distance ring 21 is formed in the planetary gear shaft 11. Through the central lubricant feed channel 24, the lubricant collection groove 22 and the plurality of lubricant channels 23 there can be a centrifugal lubrication of the planetary gear bearing 12, which is sufficient for an emergency operating mode of the planetary gear.

The axial widths $b_1$ and $b_2$ of the bearing bodies 12a and 12b and the width $b_3$ of the distance ring 21 fulfill the relationship $b_1+b_2+b_3>B$, where B refers to the desired width of the planetary gear bearing 12. In this way, the bearing bodies 12a and 12b and the distance ring 21 are axially determined. The axial determination is also produced by the retaining ring 30, through which the width B is predetermined.

After manufacturing the sliding bearing, the bearing bodies 12a and 12b and the distance ring 21 initially fulfill the relationship $b_1+b_2+b_3=B$. When the planetary gear bearing 12 is installed the widths of the two bearing bodies 12a and 12b will be adapted by metal cutting processes such that both the relationship $b_1+b_2+b_3=B$ is fulfilled and, by suitable choice of the widths $b_1$, $b_2$ and $b_3$, a desired height S of the lubrication gap 25 is set. In this case, there is the relationship $\Delta S=\Delta b \sin(\alpha)$ between a change in height $\Delta S$ of the lubrication gap 25 and an axial adjustment of the respective bearing body 12a or 12b brought about by change in width $\Delta b$.

Figure 5:
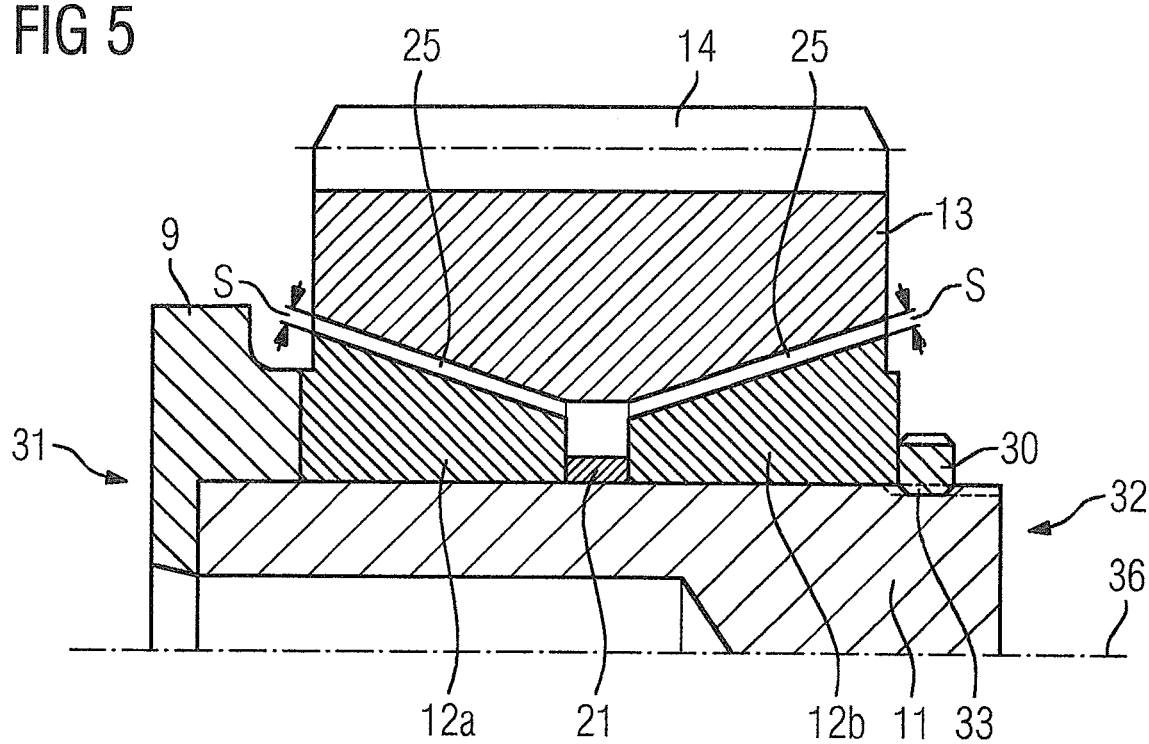
FIG. 5 shows a section of a cross-sectional view of a planetary gear carrier in accordance with the invention.

The diagram depicted in FIG. 5 shows a section of a cross-sectional view of a planetary gear bearing, in which the retaining ring 30 is screwed to the planetary gear shaft 11 via a thread 33. The bearing bodies 12a and 12b with the distance ring 21 lying between them are pressed onto the planetary carrier 9 via the retaining ring 30. Consequently, there is a set sliding support in an X arrangement for the planetary gear bearing with a one-sided planetary carrier 9.

Figure 6:
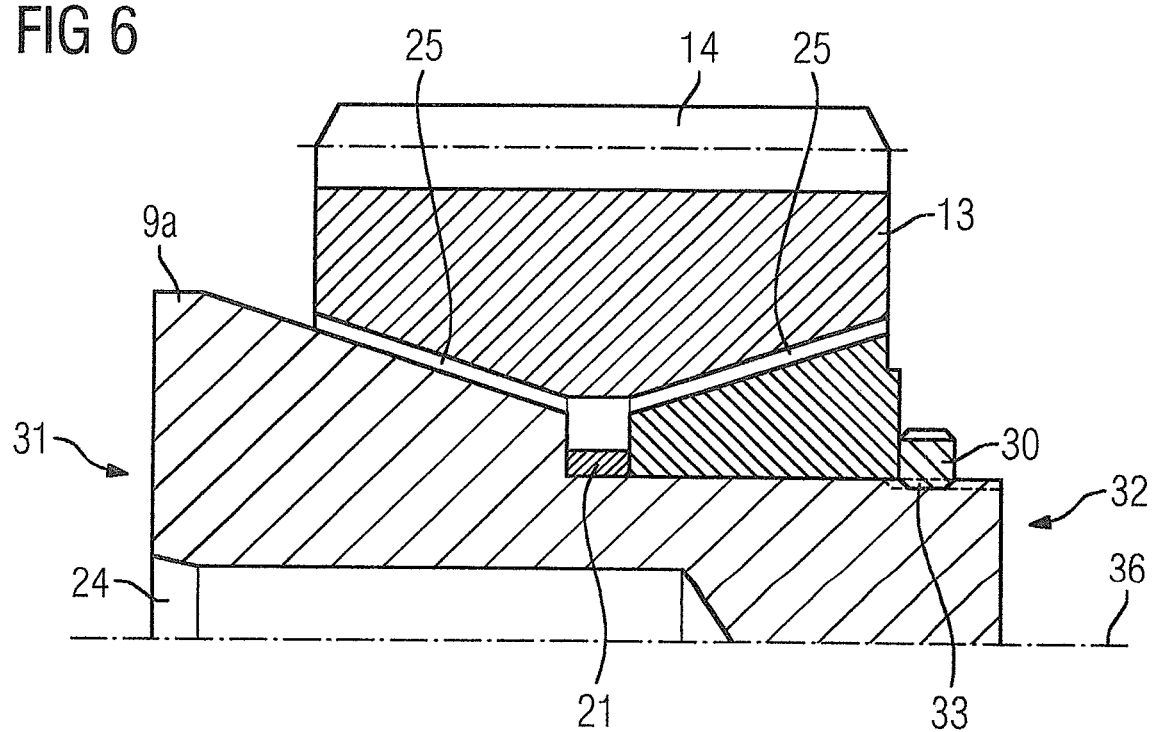
FIG. 6 shows a section of a cross-sectional view of a planetary gear carrier with a hybrid bearing body in accordance with the invention.

The diagram depicted in FIG. 6 shows a section of a cross-sectional view of a planetary gear bearing with a hybrid bearing body 9a. If the hybrid bearing body 9a from FIG. 6 is compared with elements from FIG. 5, for example, then it becomes clear that the hybrid bearing body 9a integrates the functions of the elements planetary carrier 9, bearing body 12a and planetary gear shaft 11 of FIG. 5 into one component 9a. This reduces the complexity and can increase the stiffness of the transmission.

Figure 7:
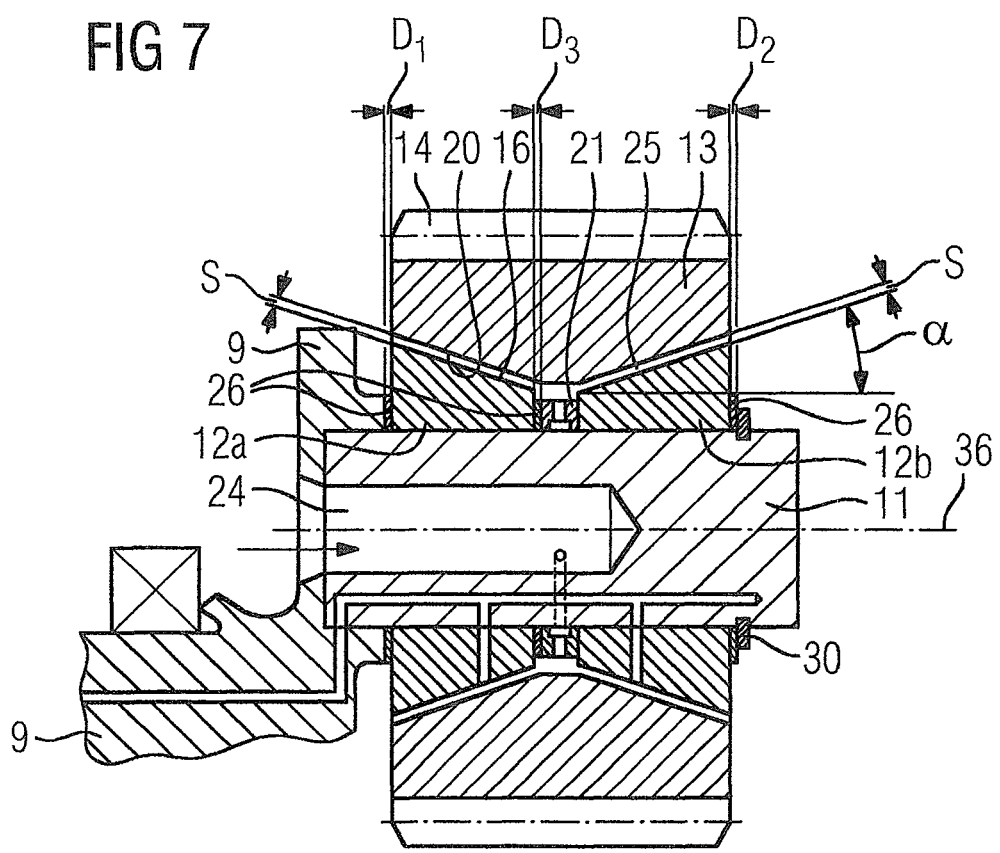
FIG. 7 shows an axial cross-sectional view of a planetary gear carrier in accordance with a second embodiment of the present invention.

The diagram depicted in FIG. 7 shows a planetary gear bearing 12 of a planetary transmission 1 according to a further embodiment of the planetary transmission. Inserted between the bearing body 12a and the distance ring 21 and also between the bearing bodies 12a, 12b and the neighboring elements in each case, such as planetary carrier 9 or retaining ring 30, are distance elements 26. The axial widths $b_1$, $b_2$ and $b_3$ of the bearing bodies 12a, 12b and of the distance ring 21, on the one hand, as well as $D_1$, $D_2$ and $D_3$ of the distance elements 26, on the other hand, fulfill the relationship $b_1+b_2+b_3+D_1+D_2+D_3=B$, so that the bearing bodies 12a, 12b, the distance ring 26 and the distance elements 26 are fixed axially in their position.

After manufacturing, the bearing bodies 12a and 12b and the distance ring 21 initially fulfill the relationship $b_1+b_2+b_3<B$ in order to set the desired height S of the lubrication gap 25. In this case, $b_1+b_2+b_3$ and B are defined as in the embodiment shown in FIG. 3, and $D_1+D_2+D_3$ refer to the axial widths of the distance elements 26.

Initially the axial widths of the bearing bodies 12a and 12b and the distance ring 21 fulfill the relationship $b_1+b_2+b_3<B$. During installation, distance elements 26 of suitable thicknesses $D_1+D_2+D_3$ are inserted at the points such that the sum of the current thicknesses $D_1+D_2+D_3$ of all inserted distance elements 26 is equal to the difference between the bearing width B and the sum of the axial widths $b_1+b_2+b_3$ of the bearing bodies 12a and 12b and the distance ring 21 and the lubrication gap S possesses the required height S.

Figure 8:
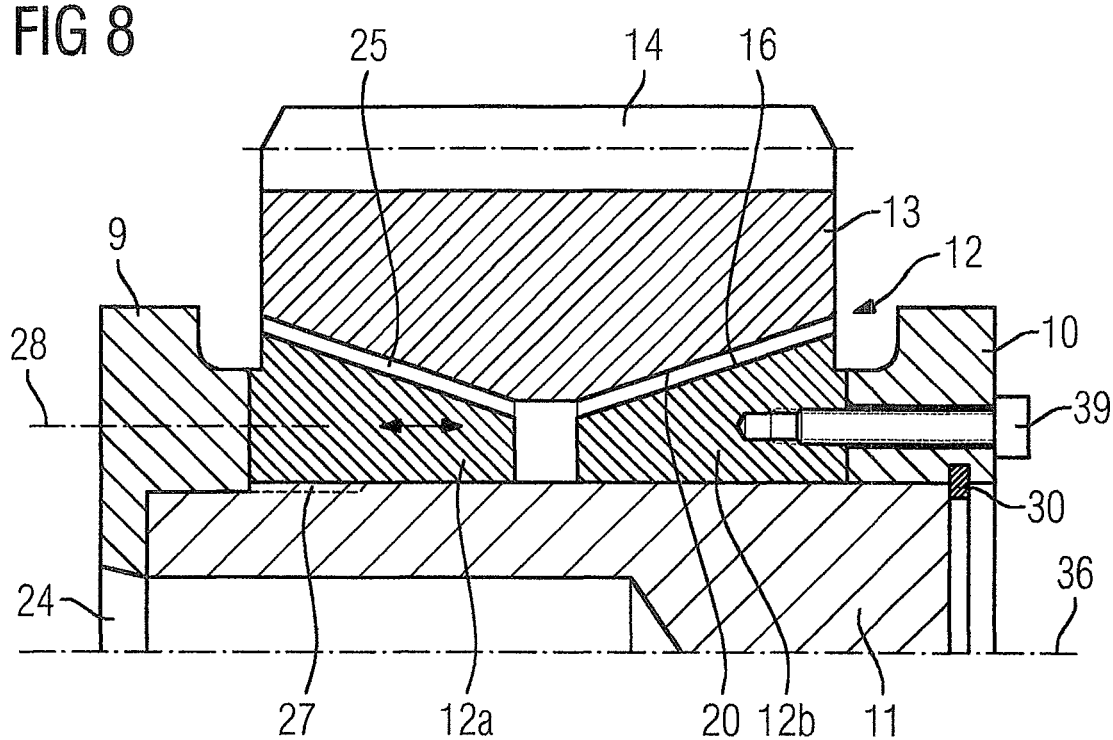
FIG. 8 shows an axial cross-sectional view of a planetary gear carrier in accordance with a third embodiment of the present invention.

The diagram depicted in FIG. 8 shows, in a section, a planetary gear bearing 12 of a planetary transmission 1 in accordance with a further embodiment. The adjustable bearing body 12a is screwed onto the planetary gear shaft 11. For this purpose, an inner thread is formed on the adjustable bearing body 12a and a corresponding outer thread on the planetary gear shaft 11. This screw connection 27 allows a stepless adjustment of the axial position of the adjustable bearing body 12a on the planetary gear shaft 11. The axially fixed bearing body 12b is screwed to a bearing body holder 10 with a screw 39. The bearing body holder 10 is axially fixed via a retaining ring 30, which projects into the planetary gear shaft 11 and into the bearing body holder 10. When the required height of the lubrication gap 25 is reached, the bearing body 12a is fixed by a torsion proofing 28 in the corresponding axial position. Pins, bolts or the like can be used as the torsion proofing 28. If the height S of the lubrication gap 25 changes over the course of time because of operation-related wear, the adjustable bearing body 12a is able to be re-adjusted appropriately, in order to restore the required height S of the lubrication gap 25.

Figure 9:
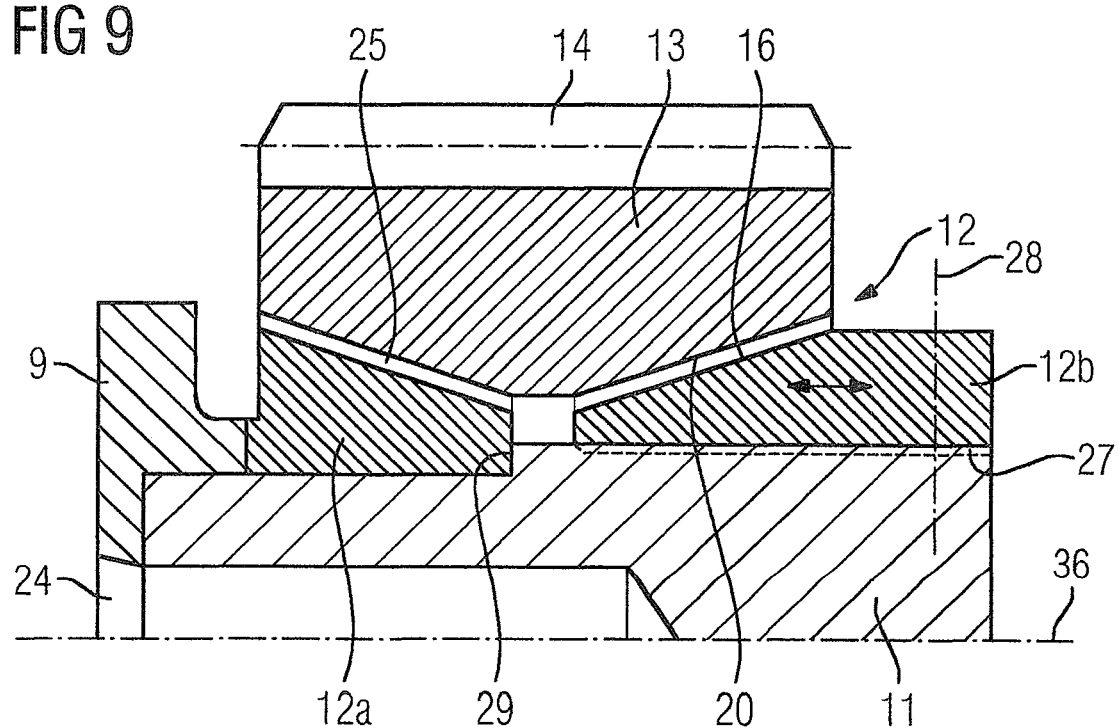
FIG. 9 shows an axial cross-sectional view of a planetary gear carrier in accordance with a fourth embodiment of the present invention.

The diagram depicted in FIG. 9 shows a planetary gear bearing 12 of a planetary transmission 1 in accordance with a further embodiment. The adjustable bearing body 12b is screwed via a thread 27 to the planetary gear shaft 11 and secured via a torsion proofing 28. The screw connection 27 makes it possible to position the bearing body 12b in the axial direction. Here too pins, bolts or the like can be used as the torsion proofing 28. The axial position of the axially fixed bearing body 12a is fixed by a radial ring shoulder 29 serving as an axial stop formed on the planetary gear shaft 11. By screwing the adjustable bearing body 12b in or out, the required height S of the lubrication gap 25 can be set. If the height S of the lubrication gap 25 of the planetary gear bearing 12 has shifted as a consequence of operation-related wear, then the planetary gear bearing 12 can be readjusted by axial adjustment of the bearing body 12b.

For a greater flexibility during adjustment of planetary gear bearings, the proposed methods and embodiments for setting an optimum height of the lubrication gap 25 of the planetary gear bearing 12 can be combined with one another.

During the operation of the planetary transmission 1, the planetary carrier 9 is set in rotation by the drive shaft 3.

On account of the engagement of its outer toothing 14 in the inner toothing 8 of the ring gear 7, the planetary gears 13 roll along the inner side of the ring gear 7. Through the rotation of the planetary gears 13, on account of the engagement of their outer toothing 14 into the outer toothing 6 of the sun gear 5, the sun gear 5 in its turn and with it the take-off shaft 4 is set in rotation. Here, the take-off shaft 4 turns at a higher rotational speed than the drive shaft 3, because the planetary gears 13 have a smaller circumference than the planetary gear axes of rotation 36 describe in their rotation about the central transmission rotational axis 37 of the planetary transmission 1.

During the operation of the sliding bearing, the bearing is continuously supplied with lubricant by the central lubricant feed channel 24. The lubricant is initially distributed in the lubricant collection groove 22 of the distance ring 21 and then flows through the at least one lubricant channel 23 in the direction of the lubrication gap 25 (see FIG. 3).

One advantage of the described planetary transmission 1 lies in the fact that, unlike cylindrical sliding bearings, no additional axial sliding bearing has to be provided in order to fix the planetary gear 13 in the axial direction. This accordingly makes the processing for formation of additional axial sliding surfaces superfluous. A further advantage of the described sliding bearing lies in the simple adjustment or readjustment of the height S of the lubrication gap 25, which allows a greater component tolerance in the manufacturing of the components needed for the planetary gear bearings. Overall cost benefits from lower manufacturing costs and an increased lifetime of the planetary gear bearing 12 as a result of the re-adjustment options can be achieved in the use of such a planetary transmission.

The diagram depicted in FIG. 10 shows a section of a cross-section of a planetary gear bearing with a flex pin 34, a conical sliding bearing with classical flex pin. The flex pin 34 carries a hollow cylinder 35. The hollow cylinder 35 carries the bearing bodies 12a and 12b, as well as the distance ring 21. A groove channel 43 is formed via the distance ring 21. The bearing body 12a is positioned axially via a stop 40. The retaining ring 30 clamps in the bearing bodies 12a and 12b, as well as the distance ring 21.

The diagram depicted in FIG. 11 shows a section of a cross-section of a planetary gear bearing with a shortened flex pin 34. The flex pin 34 ends, compared to the flex pin depicted in FIG. 10, in an axially central area of the hollow cylinder 35. The flex pin 34 is offset relative to the middle 42 of the planetary gear 13 by the offset 41. In this way, a symmetrical distribution of force can be achieved. The lower mass of the flex pin 34 depicted in FIG. 11 also reduces the inertia.

The diagram depicted in FIG. 12 shows a flex pin 34 as a shaft for the planetary gear with an integrated lubricant line 38. The lubricant line 38 (e.g., for supplying an oil) also penetrates the hollow cylinder 35 and opens out into the groove channel 43. The lubricant line 38 is offset relative to the end piece 44 of the flex pin 34. An offset 41a and 41b relative to the middle 42 of the planetary gear is produced. The offset 41a and the offset 41b are different. The end piece 44 completely covers the groove channel 42.

Through the use of a flex pin the influence of a shaft deformation and/or torsion on a skewing of the toothing is reduced and/or prevented. The gimbal joint with the hollow cylinder (sleeve) can be adapted and set via the offset 41 (see FIG. 11) of the connection of the shaft (flex pin) to the hollow cylinder (flex pin sleeve), depending on the degree of deformation.

The diagram depicted in FIG. 13 shows a section of a cross-section of a planetary gear bearing with asymmetrical bearing bodies 12a and 12b. The bearing body 12a, with its shaft length b1, has a different shaft length from the bearing body 12b (with the shaft length $b_2$). The groove channel 43 is offset relative to the middle 42 of the planetary gear by the offset 41. The first lubrication gap 25a makes a first angle α1 with the planetary gear shaft 36. The second lubrication gap 25b makes a second angle α2 with the planetary gear shaft 36. The cone angles α1 and α2 can be different for the two sliding cone bearings. The left-hand sliding bearing with the bearing body 12a is set larger than the right-hand sliding bearing with the bearing body 12b. This can likewise serve as a setting option, in order to compensate for asymmetrical deformations resulting from uneven loading.

The diagram depicted in FIG. 14 shows a section of a cross-section of a planetary gear bearing with a lubrication gap of different height 45a and 45b. The first lubrication gap 25a has a height 45a increasing from inside to outside. The second lubrication gap 25b has a height 45b increasing from inside to outside. The minimum heights of the lubrication gaps 25a and 25b are the same. The maximum heights of the lubrication gaps 25a and 25b are different. This produces asymmetrical sliding cone bearings with angular correction. The cone angles of the respective cone bearing functional surfaces are formed differently. This can be done as a geometrical correction of the sliding bearings when the deformations are correspondingly large.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A planetary transmission for a wind turbine, comprising:
   a transmission housing;
   a central sun gear retained in the transmission housing, said central sun gear rotating about a central transmission rotational axis and having an outer toothing;
   a ring gear arranged concentrically in relation to the central transmission rotational axis in the transmission housing and having an inner toothing,
   a one-sided planetary carrier mounted in the transmission housing, said one-sided planetary carrier rotating about the central transmission rotational axis;
   a plurality of planetary gears mounted on the one-sided planetary carrier via a planetary gear bearing configured as a sliding bearing such that said plurality of planetary gears rotate about the planetary gear rotational axis, said plurality of planetary gears having outer toothings which that engage with an inner toothing of the ring gear and an outer toothing of the central sun gear; and
   a lubrication gap between the conical sliding surfaces of the planetary gear bearing and the corresponding running surfaces of the supported planetary gear;
   wherein each planetary gear bearing has two annular bearing bodies, at least one of the annular bearing of the two annular bearing bodies being penetrated by a planetary gear shaft and being rotationally fixed on the planetary gear shaft, and each planetary gear bearing has conical sliding surfaces formed on the outer circumferential surfaces of the annular bearing bodies such that tapered ends of the annular bearing bodies point towards one another;
   wherein running surfaces corresponding to the conical sliding surfaces of the planetary gear bearing are formed on inner circumferential surfaces of the planetary gear; and
   wherein a first lubrication gap of lubrication gaps is different from a second of said lubrication gaps.

2. The planetary transmission as claimed in claim 1, further comprising:
   a first end face side; and
   a second end face side;
   wherein the one-sided planetary carrier is arranged in the area of the first end face side;
   wherein the at least one annular bearing body, which is penetrated by the planetary gear shaft and is rotationally fixed on the planetary gear shaft, is mechanically decoupled on the second end face side from a further planetary gear.

3. The planetary transmission as claimed in claim 1, wherein the annular bearing bodies are arranged axially spaced from one another.

4. The planetary transmission as claimed in claim 2, wherein the annular bearing bodies are arranged axially spaced from one another.

5. The planetary transmission as claimed in claim 1, further comprising:
   a retaining ring which retains at least one annular bearing body on the planetary gear shaft.

6. The planetary transmission as claimed in claim 1, wherein the planetary gear shaft is a flex pin with a hollow cylinder.

7. The planetary transmission as claimed in claim 6, wherein the flex pin has a lubrication line.

8. The planetary transmission as claimed in claim 6, wherein the first lubrication gap and second lubrication gap have a different axial length.

9. The planetary transmission as claimed in claim 1, wherein at least one of the lubrication gaps has axially different heights.

10. The planetary transmission as claimed in claim 8, wherein at least one of the lubrication gaps has axially different heights.

11. The planetary transmission as claimed in claim 1, wherein the first lubrication gap has a different inclination relative to the planetary gear rotational axis of the planetary gear than the second lubrication gap.

12. The planetary transmission as claimed in claim 8, wherein the first lubrication gap has a different inclination relative to the planetary gear rotational axis of the planetary gear than the second lubrication gap.

13. The planetary transmission as claimed in claim 9, wherein the first lubrication gap has a different inclination relative to the planetary gear rotational axis of the planetary gear than the second lubrication gap.

14. The planetary transmission as claimed in claim 1, wherein at least one bearing body is adjustable in the axial direction to set a lubrication gap having a defined height between the conical sliding surfaces of the planetary gear bearing and the corresponding running surfaces of the supported planetary gear.

15. The planetary transmission as claimed in claim 1, wherein precisely one annular bearing body, of the two annular bearing bodies, is adjustable and another bearing body of the two annular bearing bodies has an axially fixed position.

16. The planetary transmission as claimed in claim 15, wherein the axially fixed position of the axially fixed annular bearing body is defined by an axial stop.

17. The planetary transmission as claimed in claim 16, wherein the axial stop comprises a radial ring shoulder of the planetary carrier formed on the planetary gear shaft.

18. The planetary transmission as claimed in claim 15, wherein the adjustable bearing body of the two annular bearing bodies is assigned an adjuster for axial adjustment.

19. The planetary transmission as claimed in claim 16 wherein the adjustable bearing body of the two annular bearing bodies is assigned an adjuster for axial adjustment.

20. The planetary transmission as claimed in claim 18, wherein the adjuster comprises distance elements which are arranged between at least one of (i) a bearing body and a neighboring flange of the planetary carrier and (ii) between the annular bearing bodies.

21. The planetary transmission as claimed in claim 15, wherein the adjustable bearing body of the annular bearing bodies of the two annular bearing bodies is screwed to the planetary gear shaft.

22. The planetary transmission as claimed in claim 18, wherein the adjustable bearing body of the two annular bearing bodies is screwed into the neighboring flange of the planetary gear carrier.

23. The planetary transmission as claimed in claim 21, further comprising:
a torsion proofing via which the adjustable bearing body of the two annular bearing bodies is axially fixable.

24. The planetary transmission as claimed in claim 22, further comprising:
a torsion proofing via which the adjustable bearing body of the two annular bearing bodies is axially fixable.

25. The planetary transmission as claimed in claim 1, wherein at least one lubrication pocket is formed in each conical sliding surface, into which a lubrication channel opens out, which radially penetrates the annular bearing bodies; and wherein the lubrication channel is connected to an eccentric lubricant feed channel which is formed in the planetary gear shaft and axially penetrates said shaft.

26. The planetary transmission as claimed in claim 1, further comprising:
a distance ring arranged between the annular bearing bodies, distance ring surrounding the planetary gear shaft and defining a minimum axial spacing between the annular bearing bodies.

27. The planetary transmission as claimed in claim 26, further comprising:
an annular lubrication collection groove formed on an inner circumferential surface of the distance ring.

28. The planetary transmission as claimed in claim 27, wherein a plurality of lubrication channels, which open out into the lubrication collection groove, are formed in the distance ring.

29. The planetary transmission as claimed in claim 28, wherein a central lubricant feed channel, which opens out into the lubrication collection groove of the distance ring, is formed in the planetary gear shaft.

* * * * *